United States Patent
Forsyth et al.

(10) Patent No.: US 9,919,849 B2
(45) Date of Patent: Mar. 20, 2018

(54) CLOSURE FOR A BEVERAGE CUP

(71) Applicant: KeepCup Pty Ltd, Fitzroy, Victoria (AU)

(72) Inventors: James Benjamin Forsyth, Fitzroy (AU); Ricardo Figari, North Melbourne (AU); Brett Capron, North Melbourne (AU); Marcus Krigsman, North Melbourne (AU); Steve Martinuzzo, North Melbourne (AU)

(73) Assignee: KeepCup Pty Ltd, Fitzroy, Victoria (AU)

( * ) Notice: Subject to any disclaimer, the term of this patent is extended or adjusted under 35 U.S.C. 154(b) by 0 days.

(21) Appl. No.: 14/893,459

(22) PCT Filed: May 23, 2014

(86) PCT No.: PCT/AU2014/000546
§ 371 (c)(1),
(2) Date: Nov. 23, 2015

(87) PCT Pub. No.: WO2014/186835
PCT Pub. Date: Nov. 27, 2014

(65) Prior Publication Data
US 2016/0107808 A1    Apr. 21, 2016

(30) Foreign Application Priority Data
May 23, 2013 (AU) ................................ 2013901844

(51) Int. Cl.
*B65D 47/26* (2006.01)
*A47G 19/22* (2006.01)
(Continued)

(52) U.S. Cl.
CPC ....... *B65D 47/265* (2013.01); *A47G 19/2272* (2013.01); *B65D 51/1633* (2013.01); *B65D 51/1683* (2013.01); *B65D 81/3869* (2013.01)

(58) Field of Classification Search
CPC .. B65D 47/265; B65D 47/266; B65D 47/261; B65D 47/26; B65D 47/20;
(Continued)

(56) References Cited

U.S. PATENT DOCUMENTS 2,505,380 A * 4/1950 Blefeld .............. A47G 19/2227
220/630
2,689,469 A * 9/1954 Happe ................ A47G 23/0216
220/630
(Continued)

FOREIGN PATENT DOCUMENTS

| CN | 202009993 | 10/2011 |
| CN | 202558000 | 11/2012 |
| CN | 202775532 | 3/2013 |

OTHER PUBLICATIONS

PCT/AU2014/000546 International Search Report dated Jul. 25, 2014 (5 pages).
(Continued)

*Primary Examiner* — Robert J Hicks
(74) *Attorney, Agent, or Firm* — Michael Best & Friedrich LLP

(57) ABSTRACT

A closure for a beverage cup. The closure comprises a lid having a drinking opening and a rotatable member in rotatable engagement with the lid. The rotatable member swivels laterally of the lid between an open and a closed position. The rotatable member being adapted to close the opening in the lid when the rotatable member is in a closed position. The closure also comprises a vent in the lid that vents into a void under the rotatable member. When the rotatable member is in the closed position the void is sealed
(Continued)

to an outside of the closure and when the rotatable member is in the open position the void is open to the outside.

17 Claims, 13 Drawing Sheets

(51) Int. Cl.
*B65D 81/38* (2006.01)
*B65D 51/16* (2006.01)

(58) Field of Classification Search
CPC ............ B65D 51/1683; B65D 51/1672; B65D 51/1644; B65D 51/1633; B65D 81/3869; A47G 19/2272; A47G 19/2266
USPC ..... 220/592.17, 592.16, 254.4, 254.3, 254.1, 220/820, 821, 810, 367.1, 714, 711, 253, 220/715, 713, 345.4, 345.1; 222/472, 222/470, 531, 537, 548, 559, 560
See application file for complete search history.

(56) References Cited

U.S. PATENT DOCUMENTS

| | | | |
|---|---|---|---|
| 4,436,216 A * | 3/1984 | Chang | B65D 23/001 215/376 |
| 5,082,134 A * | 1/1992 | Ramsey | B65D 47/265 220/254.4 |
| 5,294,014 A | 3/1994 | Wyatt et al. | |
| 6,352,166 B1 * | 3/2002 | Copeland | B65D 47/249 215/387 |
| 2005/0006386 A1 | 1/2005 | Ronn et al. | |
| 2011/0068113 A1 | 3/2011 | Kim | |
| 2012/0118890 A1 * | 5/2012 | Gilbert | A47G 19/2272 220/254.9 |
| 2013/0213966 A1 | 8/2013 | Steininger et al. | |

OTHER PUBLICATIONS

European Search Report for Application No. 14800738.8 dated Mar. 31, 2017 (6 pages).

* cited by examiner

CLOSURE FOR A BEVERAGE CUP

The present invention relates to a closure for a beverage cup, and various features of a beverage cup.

BACKGROUND

Most coffee outlets across the world provide coffee lovers with coffee beverages served in disposable paper cups. There is a resurgence in reusable beverage cups with the recognition that disposable cups create unnecessary wastage and in seeking a more sustainable attitude users are bringing their reusable cups to cafes requesting that they be used in place of disposable cups. While the advantages to reduced wastage are obvious, reusable coffee cups suffer from problems including an inability to maintain the high temperatures of tea and coffee for a prolonged period of time or the transfer of uncomfortable heat from the beverage to a user's hand. In addition, beverage cups filled with iced drinks have a similar problem, as they 'sweat' due to condensation, causing the cup to become harder to grip.

Regardless, with both single use and reusable beverage cups there are problems with adequately retaining the contents of the beverage cup in certain circumstances. For example, single use beverage cups often have a lid with a spout or a mouth piece that is not sealable. In these cups there is often the chance of spillage when walking with the cup or balancing the cup when trying to open doors, etc. Also, leakage may occur from inadequate sealing between the lid and cup.

As such, it would be desirable to overcome one or more problems associated with known beverage cups.

SUMMARY OF THE INVENTION

The invention provides a closure for a beverage cup, the closure comprising: a lid having a drinking opening; a rotatable member in rotatable engagement with the lid, wherein the rotatable member swivels laterally of the lid between an open and a closed position, the rotatable member being adapted to close the opening in the lid when the rotatable member is in a closed position; and a vent in the lid that vents into a void under the rotatable member; wherein when the rotatable member is in the closed position the void is sealed to an outside of the closure and when the rotatable member is in the open position the void is open to the outside.

An advantage of having a sealed void into which fluid enters through a vent is that a more reliable seal can be provided. This is due to the fact that the void is sealed rather than the vent, which expands the options available for providing sealing. For example, the seal is more readily adapted to withstand the effects of repeated use, such as wear from friction. Wear can also be controlled by providing a seal that is of a different material to the lid. This reduction in wear in turn maintains the integrity of the seal, and allows a smooth rotational movement if the rotatable member.

In addition, by providing a void that is vented, it is possible to have more than one vent location. Providing multiple vent locations reduces the likelihood of complete blockage of the vent. Also, the manufacturer is able to select a location anywhere inside the void for the vent to be positioned.

In a preferred embodiment the void is sealed to an outside of the closure by being located on one side of a barrier and when the rotatable member is in the open position an access path moves to bridge the barrier to open the void to the outside.

The void may be defined by a space between the rotatable member and the lid, which space can be sealed against escape of fluid from/to the outside of the closure. Sealing of the space occurs when the rotatable member is moved to the closed position and is preferably effected by opening and closing an access path between the lid and rotatable member. In this embodiment, an access path, bridges across the barrier, which in one embodiment is a sealing ridge on the lid, to open the void to the outside. Specifically, fluid, and in particular gas, can pass between the void and outside the closure (when mounted on a beverage cup) by flowing into the access path and over the sealing ridge to escape out from under the rotatable member. The flow path is reversed for fluid flow into the beverage cup. In some embodiments the access path is located on one or the other side of the barrier when the rotatable member is in the closed position. The access path may be defined by a recess on an underside of the rotatable member. In a preferred embodiment the recess is a dome. In some embodiments the barrier is a sealing ridge and the access path bridges the sealing ridge when the rotatable member is in the open position.

Preferably the sealing ridge is a continuous loop, or part loop, that extends around the vent and the loop contains an enlarged path that in the closed position of the rotatable member, which corresponds to the void being sealed, the enlarged path encloses the access path within the void so that it no longer bridges the ridge, but is contained within the sealing ridge.

In one embodiment, the rotatable member engages with the lid at an engagement. The vent can be provided at the engagement and through one or more gaps between the lid and rotatable member at the engagement. In some embodiments the void is annular and extends around the engagement.

By having a void that is sealed when the rotatable member is in a closed position, the engagement is able to extend all the way through the lid and into the cup without creating a leakage point, so long as the engagement is contained within the void. In addition, by providing the vent at the engagement the closure effectively reduces the number of leakage points (e.g. instead of having a first hole for the vent and a second hole for the engagement, only one hole is required).

The engagement is preferably a cam engagement between the lid and the rotatable member, so that when the rotatable member is rotated to the closed position a cam surface at the engagement causes the rotatable member to urge against the lid, thereby creating a tighter engagement there between, and consequently a better seal at the sealing ridge, and also at the plug and drinking opening. In addition, by providing a better seal at the sealing ridge there is also provided a better seal for the vent.

In addition, the sealing ridge may be overmoulded onto the lid, enabling a more deformable material to be used for the sealing ridge, to create a better seal at the void.

A plug is preferably provided on an underside of the rotatable member to plug the drinking opening closed.

The invention also provides a closure for a beverage cup, the closure comprising: a lid having a drinking opening; a rotatable member in rotatable engagement with the lid, wherein the rotatable member swivels laterally of the lid between an open and a closed position, the rotatable member being adapted to close the opening in the lid when the rotatable member is in a closed position; and the rotatable member being engaged with the lid at a cam engagement so that when the rotatable member is rotated to the closed position the cam engagement causes the rotatable member to urge against the lid.

In an embodiment the rotatable member is removeably attached to the lid by a bayonette fitting. This allows the rotatable member to be easily attached and detached from the lid. In some embodiments the cam engagement comprises a first cam surface on the bayonette fitting. The first cam surface may be on the rotatable member. Alternatively, the first cam surface may be on the lid. If the first cam surface is on the rotatable member the cam engagement may comprises a second cam surface on the bayonette fitting, wherein the second cam surface is on the lid. The cam surface(s) may be in the shape of a wedge.

The invention further provides a closure for a beverage cup, the closure comprising: a lid adapted to fit over the mouth of the beverage cup, the lid being made of a first material and having a drinking opening; a rotatable member in rotatable engagement with the lid, wherein the rotatable member swivels laterally of the lid between and open and a closed position, the rotatable member being adapted to close the opening in the lid when the rotatable member is in a closed position; and a second material overmoulded on a surface of the lid that provides a seal at the surface.

The seal could, for example, be a cap seal between the beverage cup and the lid, a plug seal at the drinking opening, or a sealing ridge on the lid. It will be understood that one or more of these seals could be provided on a single closure, however that not all are required.

The invention still further provides a boot for removably attaching to a beverage cup, the boot having an annular body that surrounds an exterior surface of the beverage cup: the body of the boot having resilient segments spaced around the body.

In some embodiments the segments comprise a lip adapted to locate into a corresponding groove on the beverage cup. This allows the boot to be more effectively retained on the beverage cup.

There may exist an air gap between an internal surface of the boot body and the exterior surface of the beverage cup. The boot may be provided with spacers on an internal surface of the boot body to create a consistently spaced air gap between the internal surface of the boot body and the exterior surface of the beverage cup.

A flexible band may be provided overlying the boot body to retain the segments against the cup body. This may be achieved by the flexible band compresses against the boot body to retain the resilient segments against the beverage cup. The band may be made from an elastomer. The flexible band may comprise a lip adapted to locate into the groove in the beverage cup.

The boot body may further extend down the sides of the cup and under the base of the cup to enclose the cup and create a closed-end air gap. For example, the boot may entirely encompasses a base of the beverage cup to enclose the air gap between the internal surface of the boot body and the exterior surface of the beverage cup. Alternatively, the boot body may be open at a bottom thereof, taking the form of a band itself, to allow air to flow through the air gap.

The invention further provides a beverage cup with an insulating boot comprising: a groove on an exterior surface of the beverage cup; the boot having an annular body that surrounds an exterior surface of the beverage cup: the body of the boot having resilient segments spaced around the body. The boot may comprise any of the features of the boot described above.

BRIEF DESCRIPTION OF THE DRAWINGS

An embodiment, incorporating all aspects of the invention, will now be described by way of example only with reference to the accompanying drawings in which:

FIG. 1b is a cross-sectional exploded assembly view of FIG. 1a;

FIG. 4b is a cross-sectional exploded assembly view along the line A-A in FIG. 4a;

FIG. 5b is a section view along the line C-C in FIG. 5a;

FIG. 5d is a section view along the line A-A in FIG. 5a;

FIG. 6b is a section view along the line C-C in FIG. 6a;

FIG. 6d is a section view along the line A-A in FIG. 6a;

FIG. 7b a cross-sectional exploded assembly view of FIG. 7a.

DETAILED DESCRIPTION OF THE INVENTION

Figure 1A:
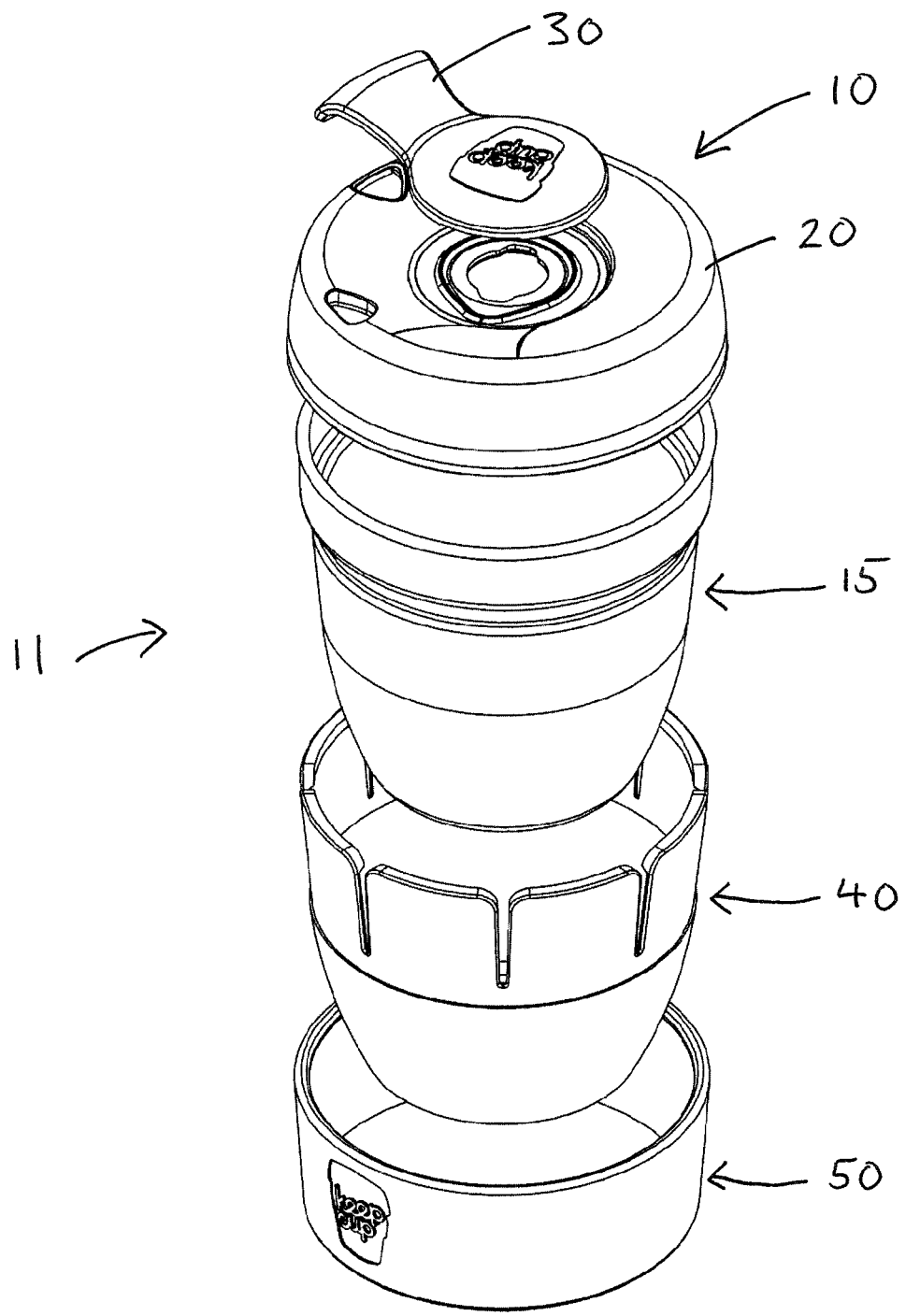
FIG. 1a is an isometric exploded assembly view of a beverage cup including cup components in accordance with an embodiment of the invention.
Figure 1B:
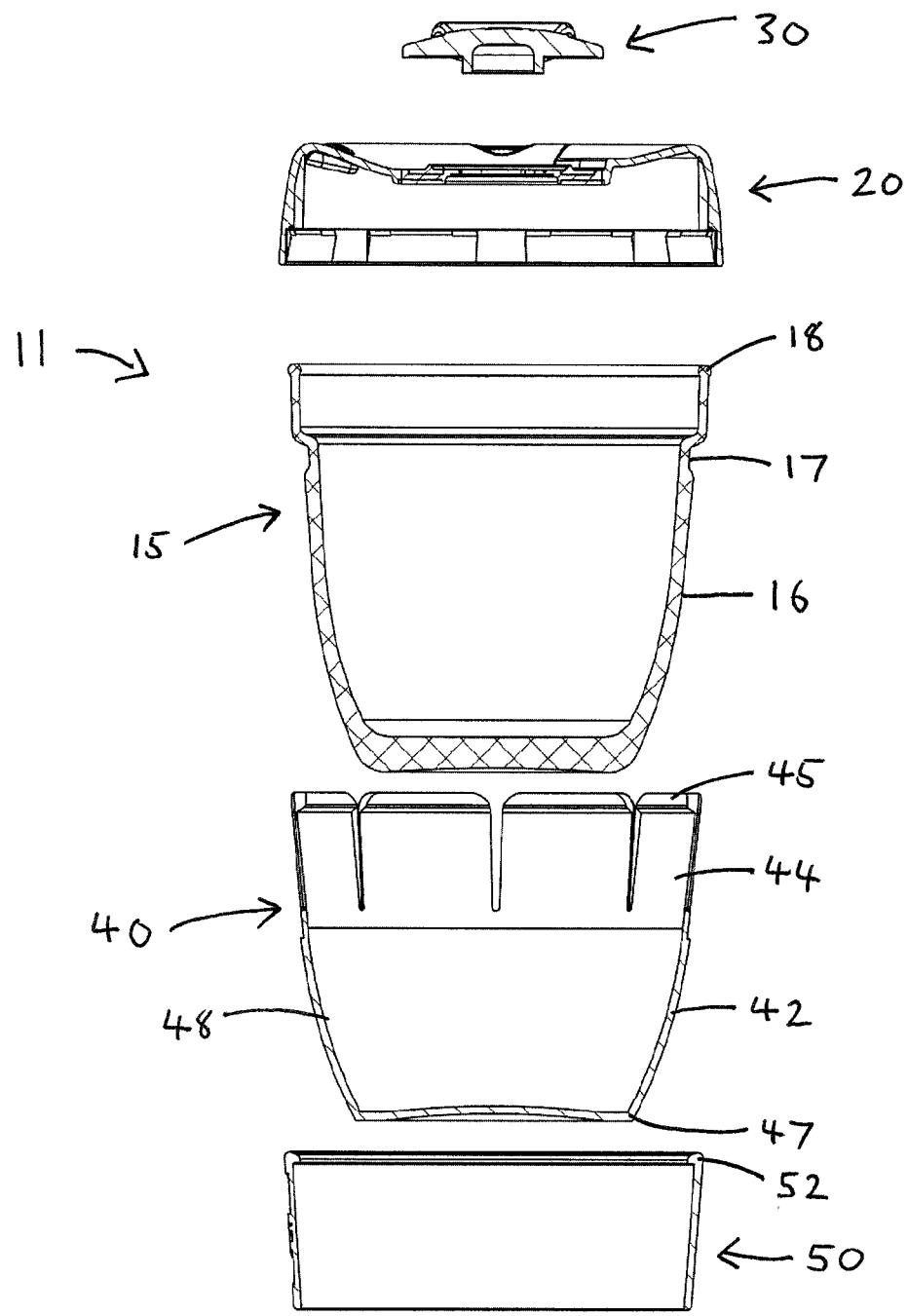

FIGS. 1a, 1b, 7a and 7b illustrate an exploded beverage cup assembly 11 including a beverage cup 15 having a closure 10 that sealingly closes an upper opening 18 of the cup 15, a boot 40,140 for removably attaching to a beverage cup 15, and a band 50 further securing the boot 40,140 against the beverage cup. FIGS. 2a to 6e illustrate the closure 10 having a lid 20 and a rotatable member 30 in rotatable engagement with the lid 20.

Figure 2A:
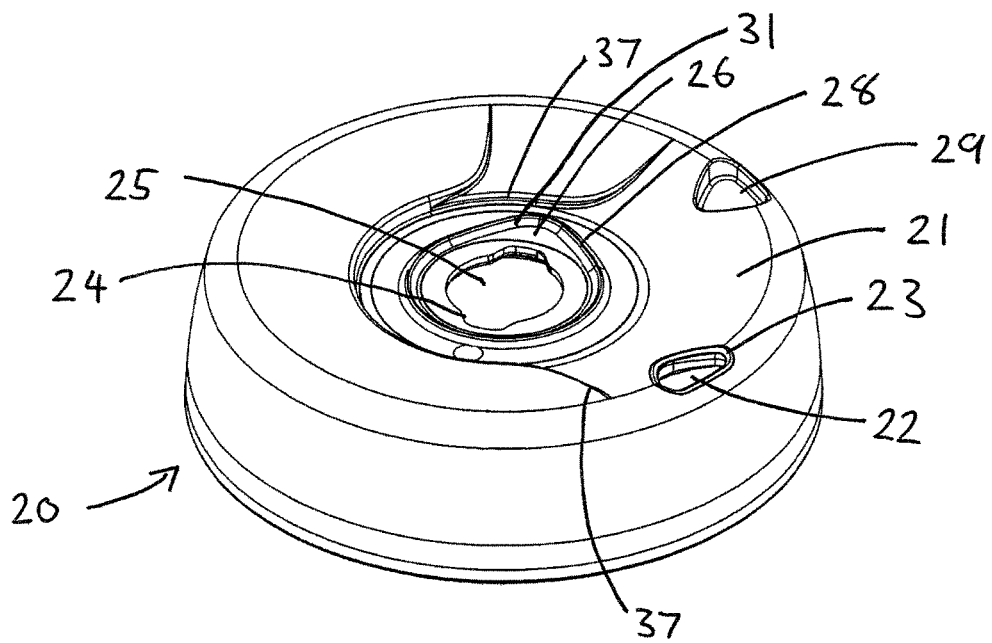
FIG. 2a is an isometric view of the top of a closure.
Figure 2B:
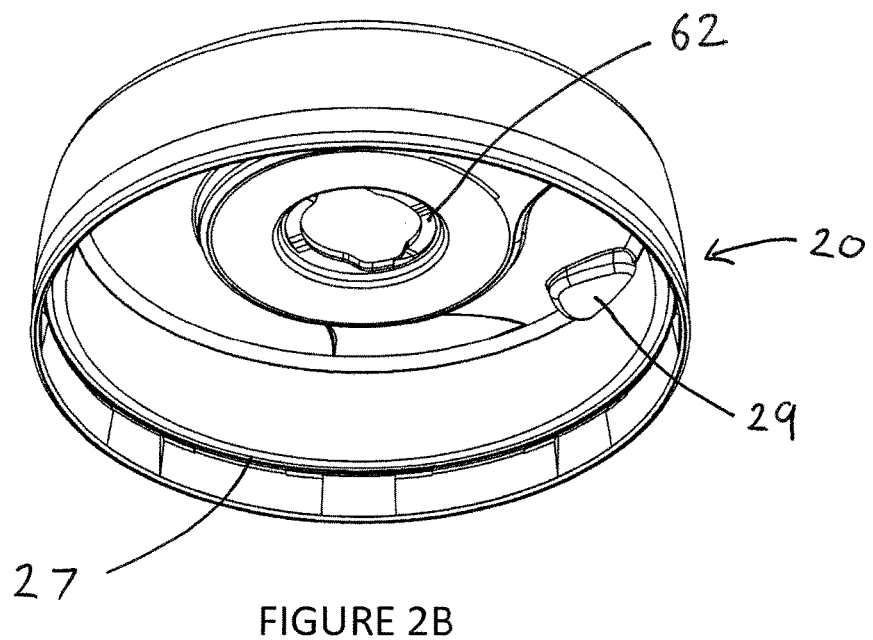
FIG. 2b is an isometric view of the bottom of a closure.
Figure 3:
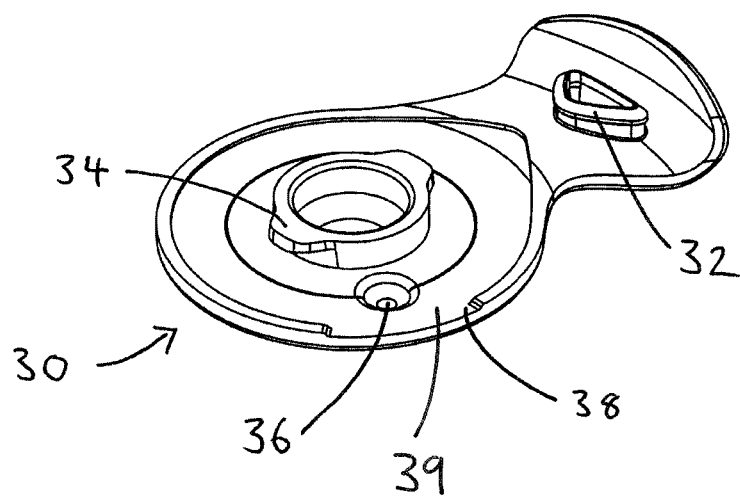
FIG. 3 is an isometric view of an underside of a rotatable member of the closure.
Figure 4A:
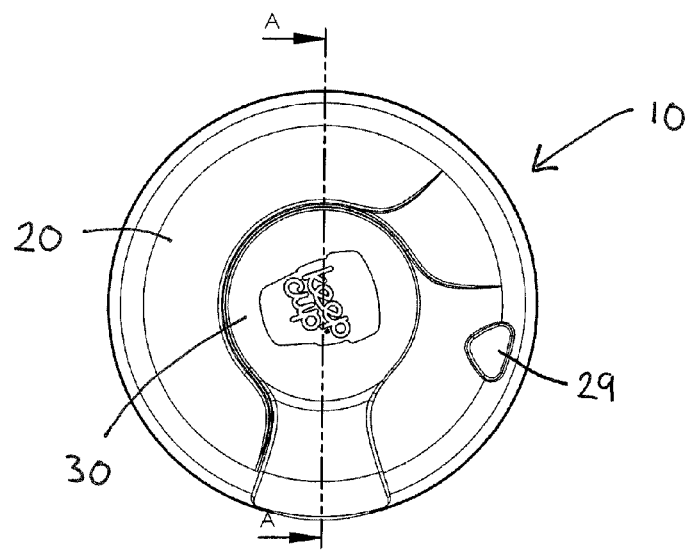
FIG. 4a is a plan exploded assembly view of the closure.
Figure 4B:
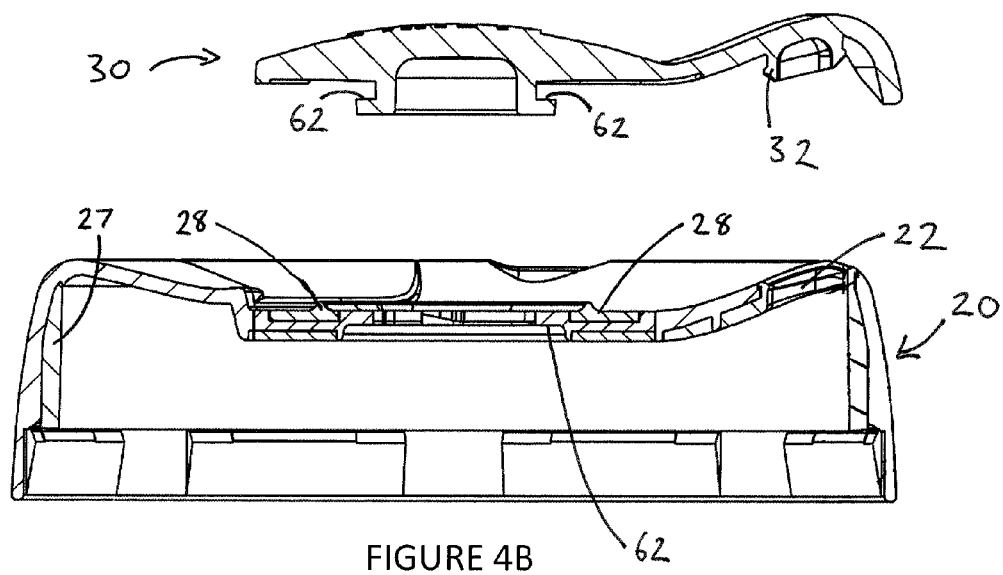

Referring to FIGS. 2a, 2b and 3, the lid 20 has a drinking opening 22 through which the contents of the beverage cup may be dispensed. In this example we will refer to the contents of the beverage cup as a hot beverage, such as coffee, however it will be understood that any hot or cold beverage could be contained within the beverage cup. Preferably the opening 22 will be on a top surface 21 of the lid 20, located towards the periphery of the top surface 21. This is to provide easy access of the user's mouth to the opening 22, allowing the user to drink directly through the opening 22, rather than having to pour the contents into another beverage container before consuming.

The rotatable member 30, which is rotatably engaged with the lid 20, is able to swivel laterally of the lid between an open position and a closed position. The terms "swivel" and "laterally" are taken to mean that the rotatable member 30 swivels about a point in the lid that is co-axial with a longitudinal axis of the cup 15 and which movement is lateral of the lid, namely in a plane above the lid.

The rotatable member 30 is removably attached to the lid 20. This attachment may be achieved in a number of ways, for example by a push fit. In the embodiment shown in the figures the attachment is achieved by a bayonette fitting 24, 34 between the lid 20 and the rotatable member 30. In addition, the rotatable member 30 has a plug 32 on its underside that is adapted to close the opening 22 of the lid 20 when the rotatable member 30 is in the closed position. The lid 20 may also comprise a holding area 29 for holding the plug 32 when he rotatable member 30 is in the open position, however this is not essential.

The lid 20 further comprises a vent 25 that allows the interior of the beverage cup 15 to vent into a void 26 under the rotatable member 30. When the rotatable member 30 is in the closed position the void 26 is sealed to an outside of the closure (and the beverage cup) and when the rotatable member 30 is in the open position the void 26 is open to the outside. This ensures that when the rotatable member 30 is in the closed position steam from the hot beverage may rise up through the vent 25 and into the void 26, but not leave the beverage cup 15. As such, the steam is trapped within the beverage cup assembly 11, minimising heat loss. In contrast, when the rotatable member 30 is in the open position, and the void 26 is open to the outside, air and steam are able to freely travel in and out of the beverage cup 15 through the vent 25, allowing pressure equalisation. Pressure equalisation is important when a user is drinking through the opening 22 as without the vent 25 the beverage will not flow out of the drinking opening 22 without air passing back through the opening 22 into the beverage cup, or deformation of the beverage cup 15 or closure 10.

In the embodiment shown in the figures the vent 25 is located at the hole for the bayonette fitting 24 in the lid 20, and specifically may comprise a number of gaps between the rotatable member and lid at the bayonette fitting. It is understood that the vent could be annular and exist around the entire bayonette fitting. However, it is also understood that the vent could be a separate hole formed in the lid.

The void 26 is defined by an annular space between the rotatable member and the lid, which space can be sealed against escape of fluid from/to the outside of the closure 10. Sealing of the space occurs when the rotatable member is moved to the closed position and an underside 39 of the rotatable member 30 contacts a sealing barrier, which in the embodiment illustrated is a sealing ridge 28 on the lid surface 21. Opening the void is brought about by opening an access path 35 between the lid and rotatable member. The access path can be a recess, for example a dome 36, formed on the underside 39 of the rotatable member that provides access over the sealing barrier by bridging across, or straddling, the sealing barrier. As shown in the Figures, dome 36 bridges the sealing ridge 28 on the lid surface 21 to open the void to the outside, when the rotatable member 30 is in the open position. Specifically, fluid, and in particular gas, can pass between the void and outside the closure (when mounted on a beverage cup) by flowing into the access path, and namely under the dome, and over sealing ridge 28, to escape out from under the rotatable member. The flow path is reversed for fluid flow into the beverage cup.

It is understood that by 'sealed' in terms of the void being sealed, the seal created at the void need not be an absolutely perfect gas-tight seal, but need only be sufficiently sealed to prevent the transfer of most fluid to an acceptable extent for the purpose of beverages.

In the preferred embodiment shown in the figure the sealing ridge 28 is a continuous loop that extends around the vent 25. The loop contains an enlarged path 31 that in the closed position of the rotatable member, which corresponds to the void being sealed, the enlarged path encloses the access path within the void so that it no longer bridges the ridge, but is contained within the sealing ridge. Accordingly, the access path to the outside is closed.

The sealing ridge 28 may be made from the same material as the lid 20, or it may be formed separately as a standard seal, for example, an O-ring. In the embodiment shown in the figures the sealing ridge 28 is formed from a different material to that of the lid 20 and specifically is overmoulded onto the lid 20. Overmoulding allows characteristics of different materials to be exploited. For example, the lid may be made of a polymer or a copolymer, such as a thermoset or a thermoplastic. More specifically, the material may be substantially rigid, such as polypropylene, polypropylene-copolymer, polyethylene (LDPE or HDPE), acrylonitrile butadiene styrene (ABS) or a polyamide (e.g. Nylon), allowing a more rigid body structure for the lid 20, while the sealing ridge 28 may be made from a more deformable material, suitable for forming a seal for the void. Examples of such overmoulded materials include Santoprene™ Infuse™ and other deformable and/or flexible and/or elastic material including forms of silicon and rubber.

Overmoulding allows two materials to be joined without the use of adhesives. In general, overmoulding utilises an initial substrate, which may or may not have been moulded, with a second material being moulded over the top of the initial substrate. The overmoulding process generally utilises mechanical interlocks to create a single part in which the materials are not separable without first breaking the interlock. The lid 20 shown in the Figures represents the initial product, or base substrate, on which overmoulding takes place, with the sealing ridge 28 being the overmoulded material. The overmoulded result can be seen most clearly in FIGS. 5c and 6c, which shows the overmoulded material, which comprises the sealing ridge 28, extending all the way through the thickness of the lid with a mechanical interlock holding it locked in the lid 20.

Figure 5A:
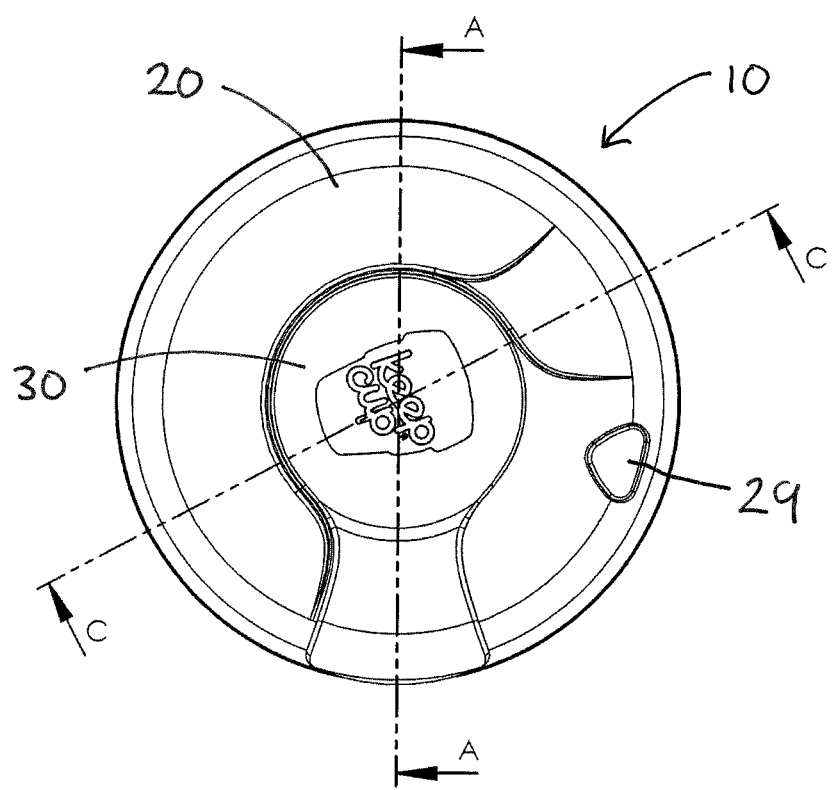
FIG. 5a is a plan view of the closure with the rotatable member in a closed position.
Figure 5B:
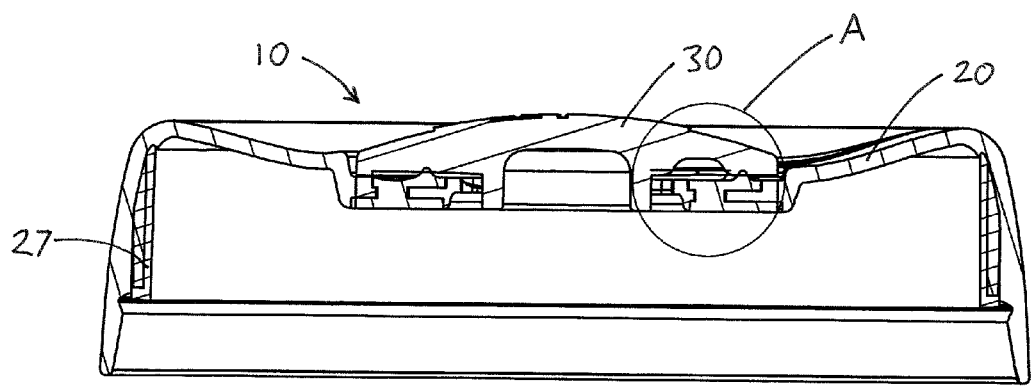
Figure 5C:
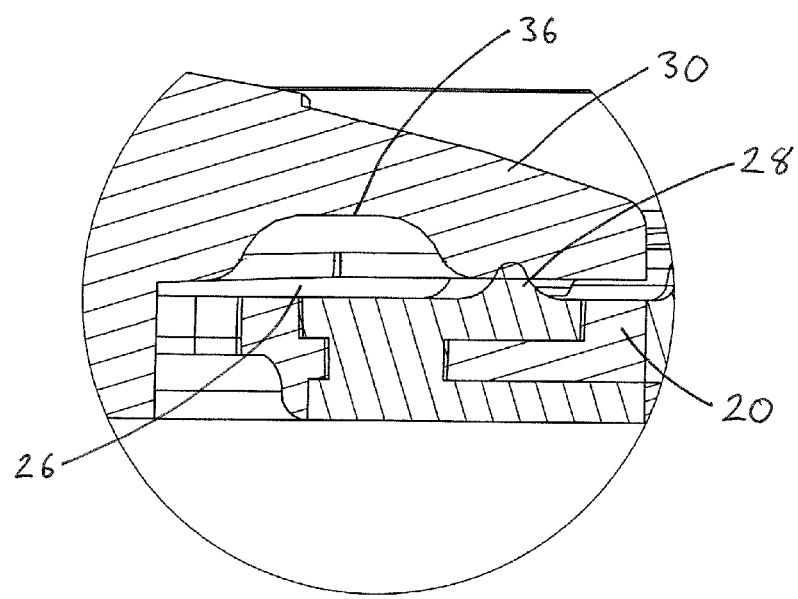
FIG. 5c is an enlarged view of detail "A" in FIG. 5b.
Figure 5D:
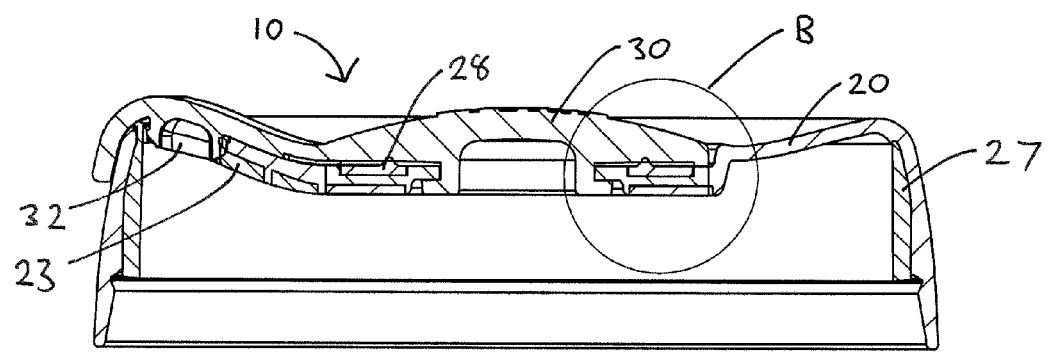
Figure 6A:
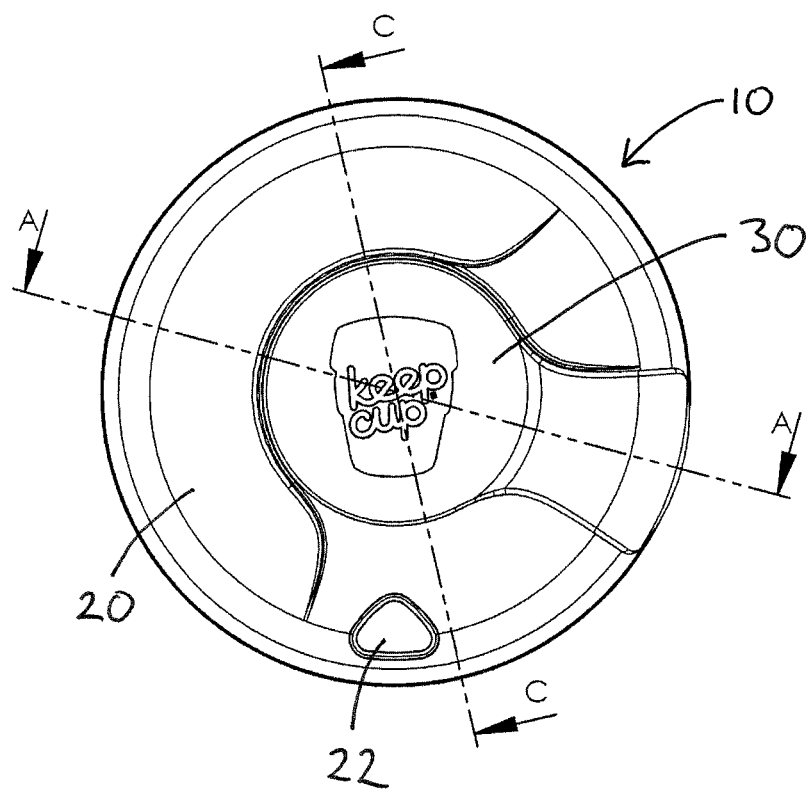
FIG. 6a is a plan view of the lid with the rotatable member in an open position.
Figure 6B:
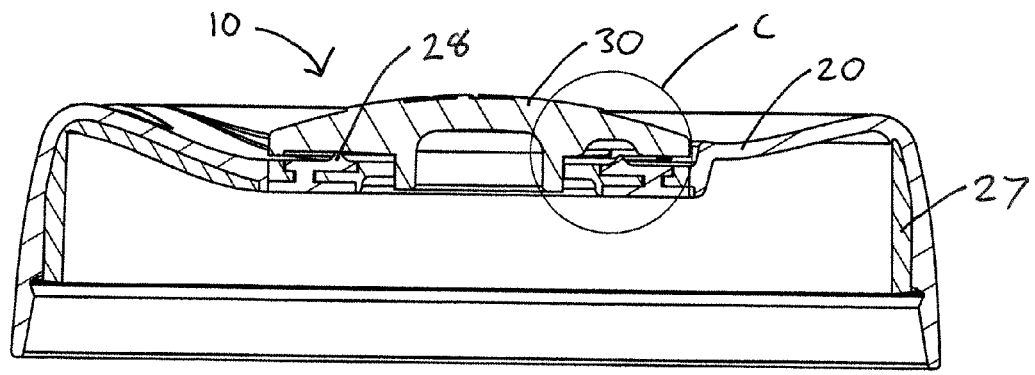
Figure 6C:
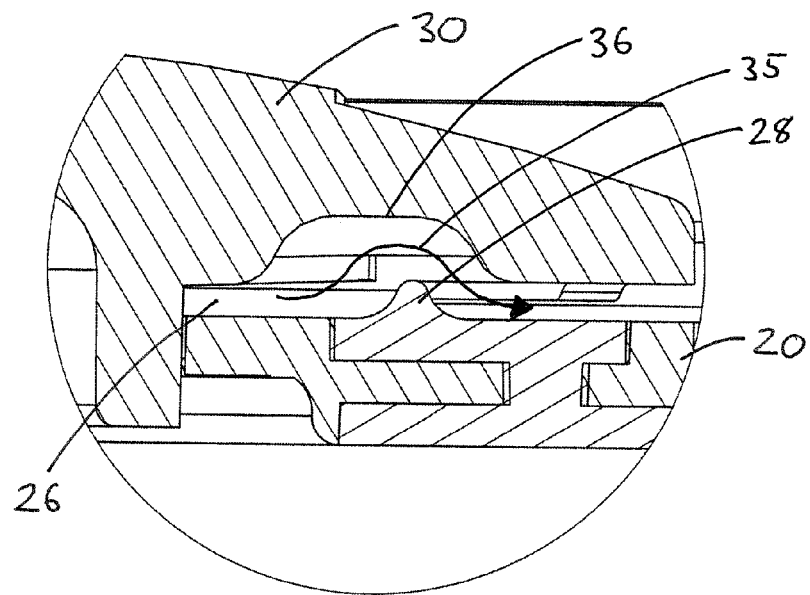
FIG. 6c is an enlarged view of detail "C" in FIG. 6b.
Figure 6D:
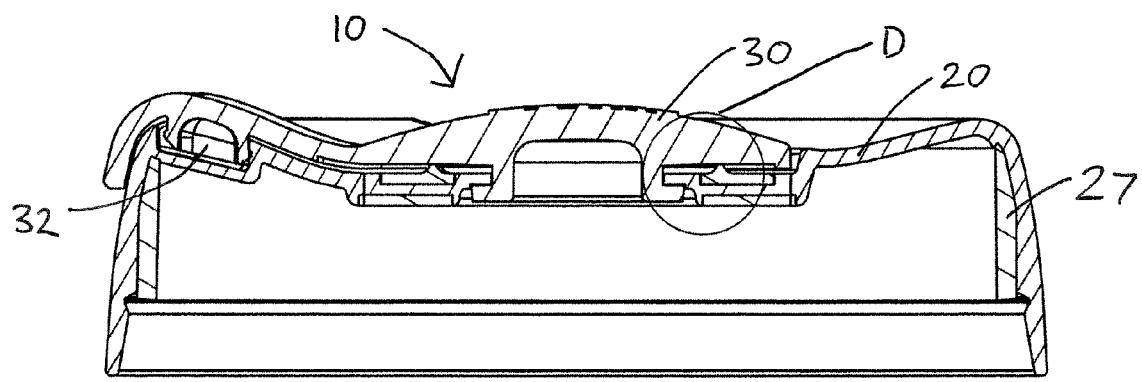

Referring to FIGS. 3, 5c and 6c, the rotatable member 30 comprises dome 36 that acts as an access path when it bridges the sealing ridge 28, when the rotatable member 30 is in the open position. As the rotatable member 30 moves to the closed position, dome 36 subscribes a part-circular path around the lid. The rotatable member 30 rotates approximately a quarter of a circle and is obstructed from rotating all the way around by moulded stops 37 in the lid). For most of the rotatable member's rotation dome 36 bridges across sealing ridge 28, but for a portion thereof dome 36 locates over the enlarged path and so the void is sealed.

This sealing in the closed position may be achieved by having the dome 36 completely on either the inside or the outside of the sealing ridge 28. In the embodiment shown in the figures the sealing ridge 28 is designed such that the dome 36 is completely within the boundary of the sealing ridge 28 when the rotatable member 30 is in the closed position (FIG. 5c).

It is understood that while the dome 36 has been described interacting with a sealing ridge 28 that has been overmoulded onto the lid 20, the sealing ridge could be formed together with the lid and from the same material.

Referring to FIG. 6c, when the user drinks from the opening 22 air flows from outside of the cup towards the sealing ridge 28, the air then flows up into the dome 36, over the sealing ridge 28, and back down on the other side of the sealing ridge 28 into the void 26. From the void 26 the air is then able to flow through the vent 25 into the beverage cup 15. To assist the air in accessing the dome 36 the rotatable member 30 may have a breather gap 38 at the periphery of the rotatable member 30, to allow air to more easily enter the dome 36 in the rotatable member 30.

Figure 5E:
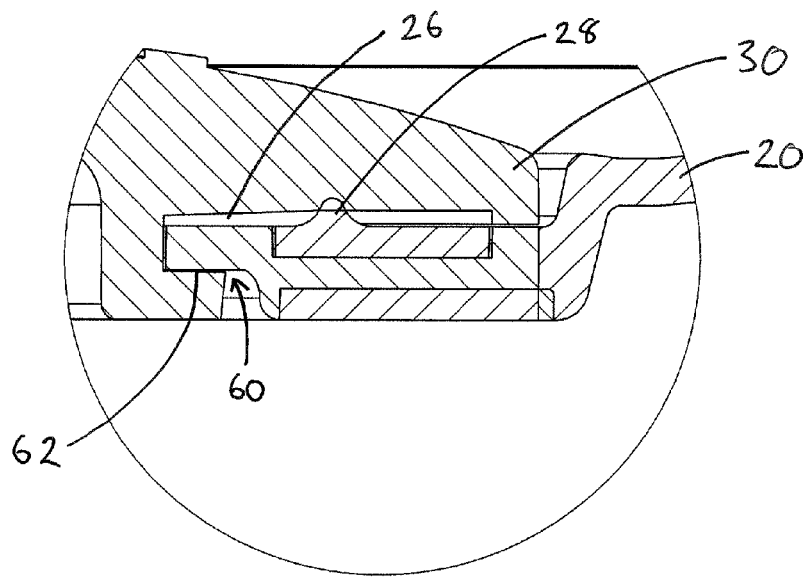
FIG. 5e is an enlarged view of a detail "B" in FIG. 5d.
Figure 6E:
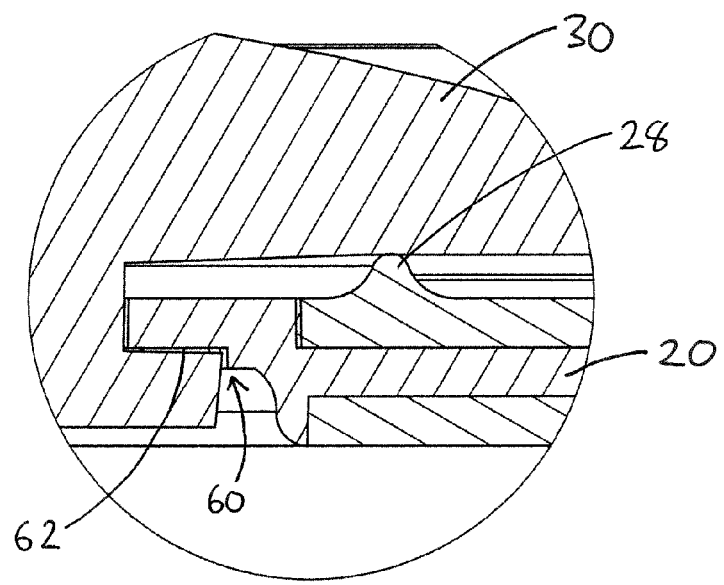
FIG. 6e is an enlarged view of detail "D" in FIG. 6d.

Referring to FIGS. 5e and 6e, the rotatable member 30 is engaged with the lid 20 at an engagement 60. The void is annular and extends around an engagement 60. The engagement 60 is a cam engagement defined by a cam surface 62 at the engagement 60. The cam surface 62 provides a cam relationship between the rotatable member and the lid such that when the rotatable member 30 is rotated to the closed position the cam surface 62 causes the rotatable member 30 to urge against the lid 20, effectively pulling the rotatable member against the lid and enhancing the seals between the member and lid, including the seals at the plug.

In the embodiment shown in the Figures, when the rotatable member 30 is pulled closer to the lid 20 the rotatable member 30 compresses the sealing ridge 28, forming a seal. The cam surface 62 may be provided on either the lid 20 or the rotatable member 30, however, in the preferred embodiment, both the lid and the rotatable member have camming surfaces. As shown in the Figures, the cam surface 62 is located on the bayonette fitting 24. The cam surface 62 is in the shape of a wedge but could also be an inclinded surface.

While the embodiment shown in the figures comprises both a cam surface 62 and a sealing ridge 28, it is understood that the closure 10 could function without the sealing ridge 28. That is, the closure 10 for the beverage cup 15 could comprise a lid 20, a rotatable member 30 engaged with the lid 20 at an engagement 60, and the engagement 60 having a cam surface 62 at the engagement of the lid 20 and the rotatable member 30. In addition, it is also understood that the cam surface 62 could function with the sealing ridge 28 whether the sealing ridge 28 was made from the same material as the lid 20 or a different material to the lid 20.

When the cam surface 62 causes the rotatable member 30 to urge against to the lid 20 the rotatable member 30 will inevitably pull the plug 32 closer/further into the opening 22 of the lid 20. This action will aid in ensuring a strong seal at the opening 22 when the rotatable member 30 is in the closed position.

While the overmoulding process previously described was used to create the sealing ridge 28 on the lid 20, it is understood that the process can be used to provide a second material overmoulded on a surface of the lid that provides a seal at the surface, such as the previously discussed sealing ridge 28, a plug seal 23 to assist in sealing the plug 32 with the opening 22, or a cap seal 27 between the beverage cup 15 and the lid 20 to assist in sealing the lid 20 with the beverage cup 15.

It is understood that a second material overmoulded on a surface of the lid that provides a seal at the surface would not require all of the above-mentioned features of the preferred embodiment to function. For example, a plug seal 23 would improve the sealing abilities of the opening 22 whether the cam surface 62 was present or not.

In order to increase the insulating capacity of the beverage cup 15 a boot 40,140 may be removably attached to the beverage cup 15. Referring to FIGS. 1a, 1b, 7a and 7b, two versions of a boot are illustrated, namely the 'long boot' 40 and the 'short boot' 140, which are discussed in more detail below.

The boot 40,140 has an annular body 42,142 that surrounds an exterior surface 16 of the beverage cup 15. The body 42,142 of the boot 40,140 has resilient segments, which appear as tabs 44,144 in the figures, spaced around the beverage cup 15. In addition, the tabs 44,144 also have a lip 45,145 at ends of the tabs that is adapted to locate into a corresponding groove 17, or undercut, on the beverage cup 15. The boot 40,140 is made of a resilient material, such as polypropylene, polypropylene-copolymer, polyethylene (LDPE or HDPE), acrylonitrile butadiene styrene (ABS) or a polyamide (e.g. Nylon). Alternatively, the boot may be made of a metal having resilient properties, for example an aluminium boot.

The boot 40,140 is sized such that there is an air gap between the internal surface 48 of the boot body 42 and the exterior surface 16 of the beverage cup 15. The boot 140 may have spacers 146 on an internal surface 148 of the boot body 142 that maintain a consistent air gap between the internal surface 148 of the boot body 142 and the exterior surface 16 of the beverage cup 15. The spacers 146 are illustrated on the short boot 140 but are not present in the illustrated embodiment of the long boot 40. Spacers 146 are equally spaced around the circumference of the boot to space the boot 140 away from the cup's exterior surface to create an air gap between an internal surface 48 of the boot 40 and the exterior surface 16 of the beverage cup 15 for an insulating effect. This is achieved by having a substantially closed air gap (as with the long boot) or an open air gap (as with the short boot) to allow airflow through the air gap to cool the surface of the cup. Insulation works to either retain the heat from the beverage inside the cup, and/or to reduce the transfer of heat from the cup through conduction to a user's hand. For added insulation the cup may be lined with a reflective film to reduce transmission of radiant heat to the cup's exterior surface 16.

A flexible band 50 is annular and overlies the boot body 42,142 and compresses against the boot body to retain the tabs 44,144 against the beverage cup 15, further securing the lip 45,145 in the groove 17. The flexible band also provides and enhanced gripping area for the user and may be made out of an elastomeric material such as silicon or rubber, so that the band is able to repeatedly stretch over the boot body 42,142 and provide a compression force against the boot body 42,142. The band 50 may also have a lip 52 adapted to locate into the groove 17 in the beverage cup 15.

Figure 7A:
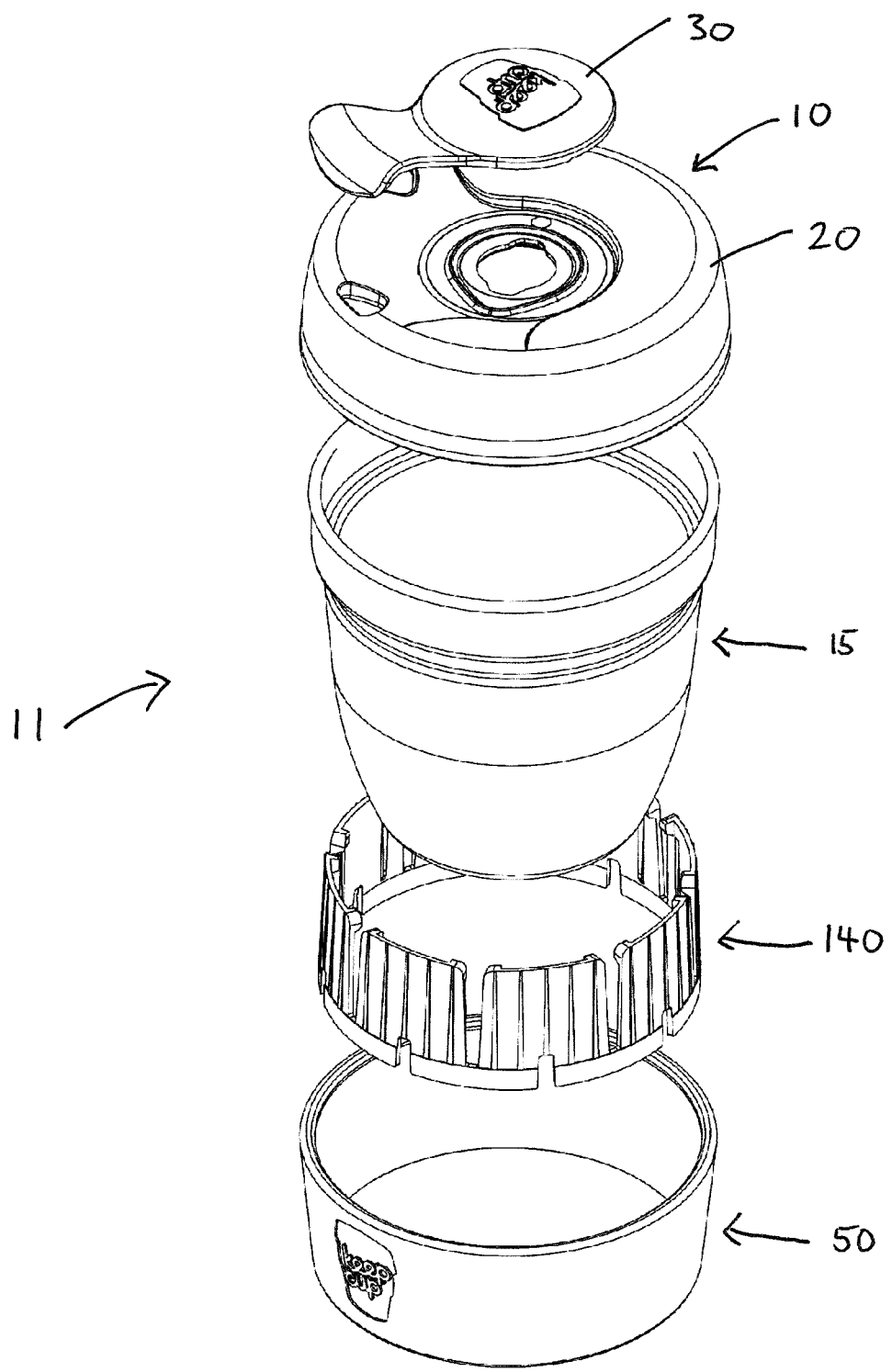
FIG. 7a is an isometric exploded assembly view of a beverage cup including cup components in accordance with another embodiment of the invention.
Figure 7B:
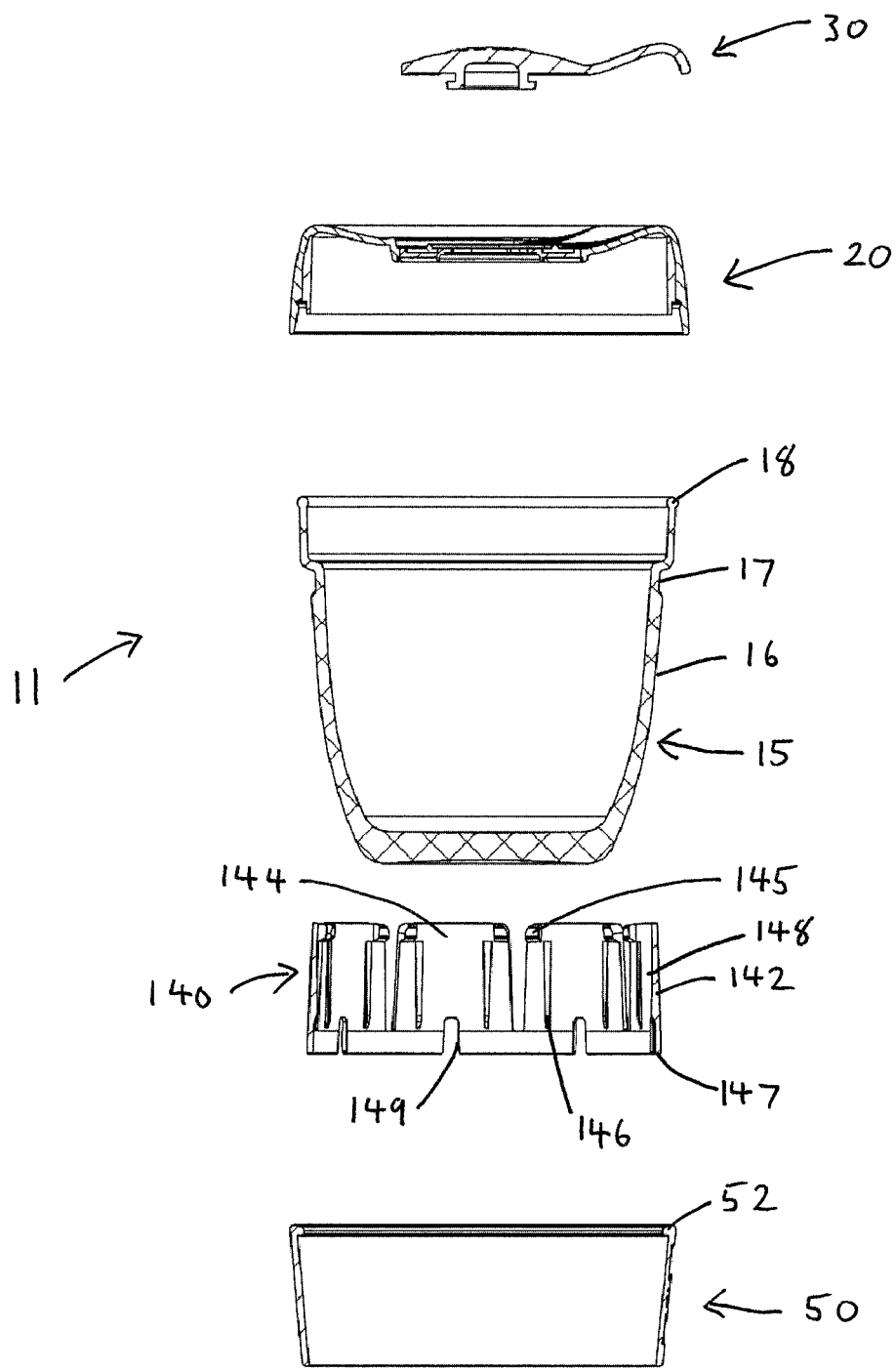

Referring to FIGS. 7a and 7b, the boot 140 may take the form of a band itself lying under band 50 and be open at the bottom 147 of the boot 140 ('short boot').The result is that the hand of the user will be insulated from the temperature of the beverage cup 15, as the air is freely able to circulate around the beverage cup 15 and under the boot 140. If the boot 140 is open at the bottom 47 of the boot 140 the spacers 146 are required to maintain the air gap between the internal surface 148 of the boot body 142 and the exterior surface 16 of the beverage cup 15. The spacers 146 also help to ensure minimal contact between the boot 40,140 and the beverage cup 15, helping to reduce the transmission of heat from the beverage cup 15 to the boot 40,140 through conduction. In addition, the spacers are tapered down the cup to provide a smoother fit on the cup. The short boot 140 may also have relief structures 149, allowing the boot 40 to stretch to accommodate manufacturing variations in the beverage cup 15, such as those that may occur if the beverage cup 15 were made from glass.

In contrast, the boot 40 may entirely encompass the base of the cup and therefore the bottom 47 of the boot 40 is closed ('long boot'). In this way, hot beverage is insulated from the outside conditions as the air gap between the beverage cup 15 and the boot 40 is enclosed. The air gap significantly reduces heat loss that occurs via conduction but radiant heat can still travel through the air barrier. A reflective material lining the internal surface 48 of the boot body 42 and/or the exterior surface 16 of the beverage cup 15 will reduce heat transfer through radiation. The reflective characteristic in the reflective material may be inherent in the material itself or may be a coating (e.g. foil) on a base substrate. Reflective surfaces can significantly reduce the transmission of radiant heat through either reflectivity and/or emissivity.

It is understood that a boot 140 with an open bottom, and a boot 40 with a closed bottom, are desirable embodiments, depending on the relative temperature difference between the beverage and the ambient surrounding air temperature.

In one form the beverage cup 15 is made of a polymer material, such as polypropylene, polyethylene, acrylonitrile butadiene styrene (ABS) or a polyamide (e.g. Nylon). However, in another form the cup 15 can be formed from glass, including all exterior grooves 17. Glass is more desirable to drink from by some users. Furthermore, glass is 100% recyclable and can be recycled indefinitely without loss of quality or performance. Preferably the glass would be tempered, reducing shard formation if the glass is ever broken. In yet another embodiment the cup 15 could be made from metal, such as aluminium.

Additionally, the band 50 may take the form of a band of cork, where cork provides excellent insulating properties. The cork band would be moulded to take the form of the exterior profile of the cup, and in particular the glass cup. If the beverage cup 15 has a groove 17, the cork band 50 would include a lip 52. The cork band could include a plasticizer and may be made from recycled cork.

It will be understood to persons skilled in the art of the invention that many modifications may be made without departing from the spirit and scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A closure for a beverage cup, the closure comprising: a lid having a drinking opening; a rotatable member in rotatable engagement with the lid, wherein the rotatable member swivels laterally of the lid between an open and a closed position, the rotatable member being adapted to close the opening in the lid when the rotatable member is in a closed position; and a vent in the lid that vents there-through and into a void located under the rotatable member; wherein when the rotatable member is in the closed position the void is sealed to an outside of the closure and when the rotatable member is in the open position the void is open to the outside.

2. The closure of claim 1, wherein the void is sealed to an outside of the closure by being located on one side of a barrier and when the rotatable member is in the open position an access path moves to bridge the barrier to open the void to the outside.

3. The closure of claim 2, wherein in the closed position the access path is located on one or the other side of the barrier.

4. The closure of claim 2, wherein the access path is defined by a recess on an underside of the rotatable member.

5. The closure of claim 4, wherein the recess is a dome.

6. The closure of claim 2, wherein the barrier is a sealing ridge and the access path bridges the sealing ridge when the rotatable member is in the open position.

7. The closure of claim 6, wherein the sealing ridge is a continuous loop that extends around the vent when the rotatable member is in the closed position.

8. The closure of claim 6, wherein the sealing ridge is overmoulded onto the lid.

9. The closure of claim 1, wherein the vent is provided at an engagement between the lid and rotatable member.

10. The closure of claim 1, wherein the rotatable member is engaged with the lid at a cam engagement so that when the rotatable member is rotated to the closed position the cam engagement causes the rotatable member to urge against the lid.

11. A closure for a beverage cup, the closure comprising: a lid having a drinking opening; a rotatable member rotatably engaged with the lid at an attachment such that the rotatable member swivels laterally of the lid between an open and a closed position, the rotatable member being adapted to close the opening in the lid when the rotatable member is in a closed position; and the rotatable member being engaged with the lid at the attachment by a cam engagement so that when the rotatable member is rotated to the closed position the cam engagement causes the rotatable member to urge against the lid.

12. The closure of claim 11, wherein the rotatable member is removeably attached to the lid by a bayonette fitting.

13. The closure of claim 12, wherein the cam engagement comprises a first cam surface on the bayonette fitting.

14. The closure of claim 13, wherein the first cam surface is on the rotatable member.

15. The closure of claim 14, wherein the cam engagement comprises a second cam surface on the bayonette fitting, wherein the second cam surface is on the lid.

16. The closure of claim 13, wherein the first cam surface is in the shape of a wedge.

17. The closure of claim 15, wherein the second cam surface is in the shape of a wedge.

* * * * *